United States Patent [19]

Cottrell et al.

[11] 4,232,811

[45] Nov. 11, 1980

[54] APPARATUS FOR DISPENSING AND INSERTING STICKS

[75] Inventors: Edward D. Cottrell; Michael B. Robbins, both of Cattaraugus, N.Y.

[73] Assignee: Champion International Corporation, Stamford, Conn.

[21] Appl. No.: 42,003

[22] Filed: May 24, 1979

[51] Int. Cl.³ ............................ A47J 43/00; B27F 7/02
[52] U.S. Cl. .................................... 227/117; 221/272; 227/120; 227/141
[58] Field of Search .................... 221/224, 272; 227/2, 227/120, 76, 100, 117, 120, 139, 141

[56] References Cited

U.S. PATENT DOCUMENTS

| 547,662 | 10/1895 | Chase | 222/117 |
| 2,733,439 | 2/1956 | Pikal | 227/2 |
| 2,895,638 | 7/1959 | White | 221/224 |
| 3,580,456 | 5/1971 | Zueger et al. | 227/100 |
| 4,025,032 | 5/1977 | O'Neil et al. | 227/141 |

Primary Examiner—Paul A. Bell

Attorney, Agent, or Firm—Evelyn M. Sommer

[57] ABSTRACT

A plurality of hopper stored sticks suitable for mounting food products or the like thereon are individually delivered through a passageway to a feed station in a horizontal position. A rotatable wheel segment provided with a stick receiving slot therein communicates with the feed station and both sequentially shifts and rotates the sticks to an inserting station where a stick delivered thereto is disposed in an upright position aligned with a vertical stick insertion axis. Inserting means including vertically shiftable product supporting structure vertically aligned with the inserting station shifts the product placed thereon along the insertion axis toward an upright stick at the inserting station thereby inserting the stick into the product. The slotted wheel segment is provided with a lever arm engagable by the product supporting structure to produce swinging movement of the wheel segment toward the the inserting station while gravity induces return of the wheel segment toward the feed station.

14 Claims, 9 Drawing Figures

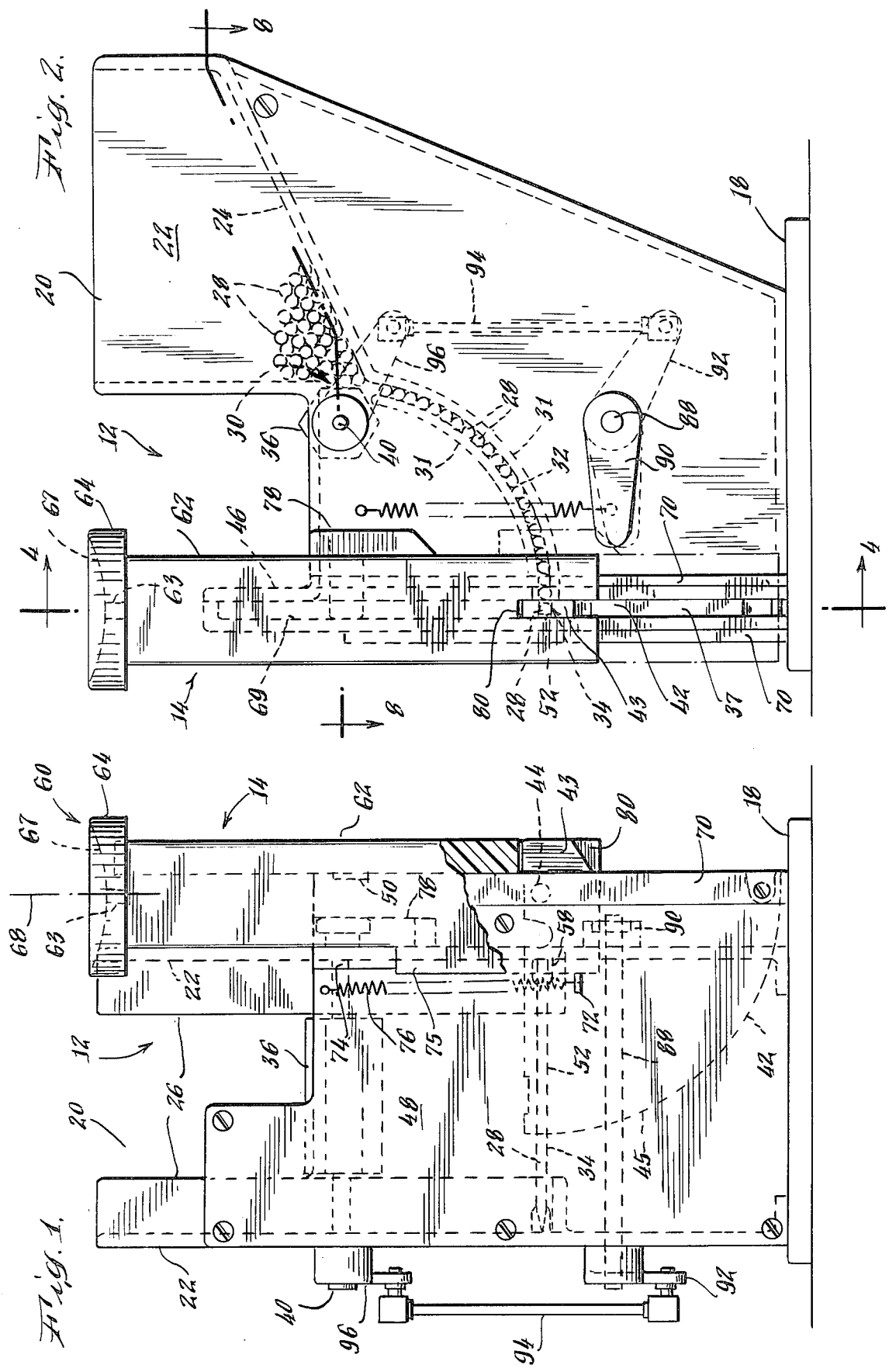

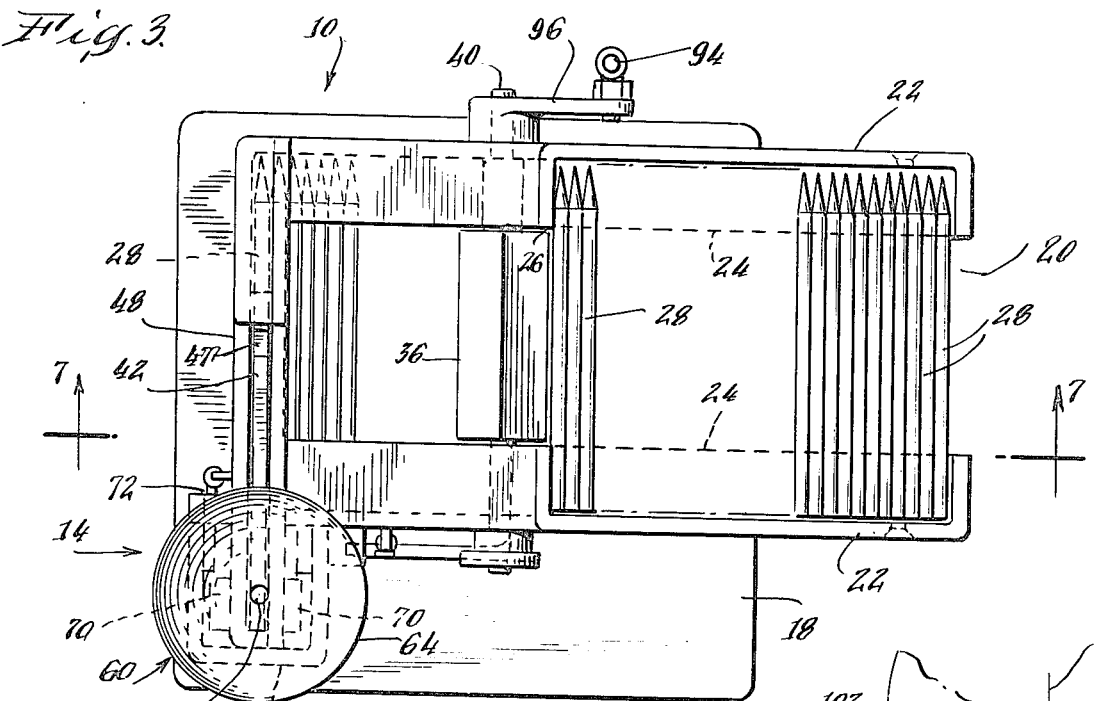
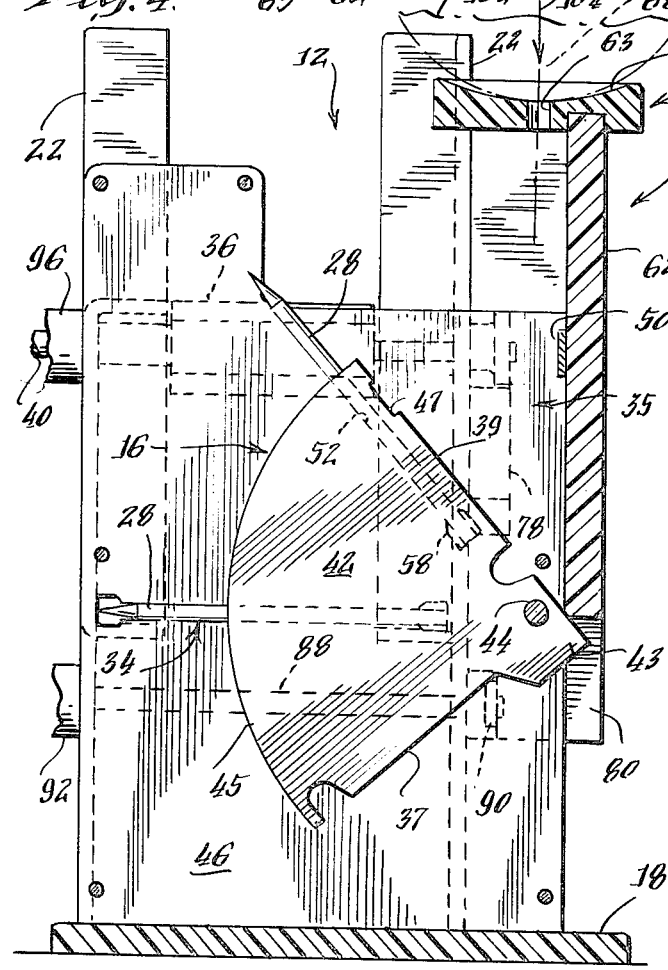
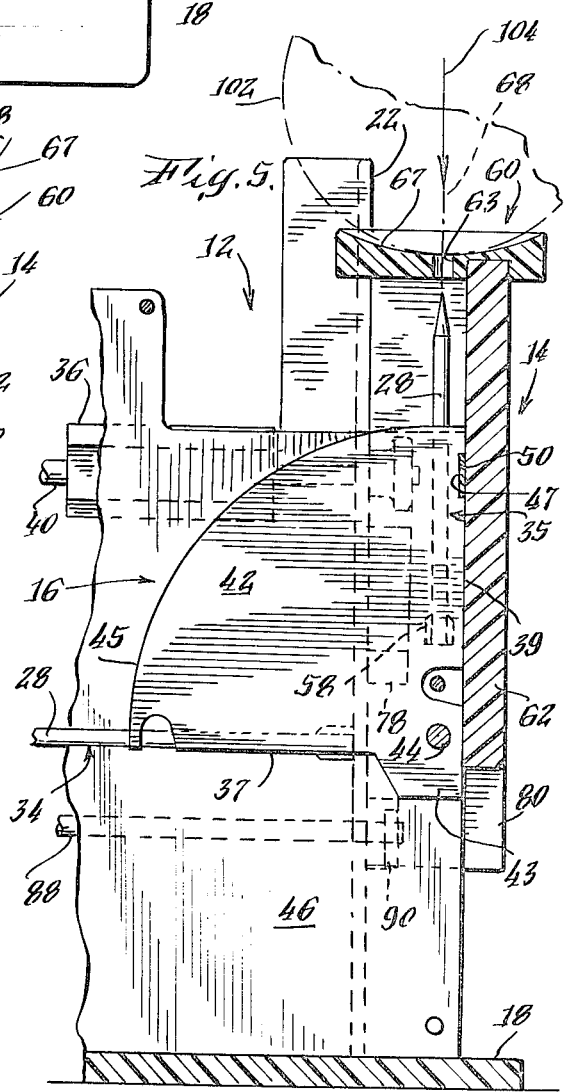

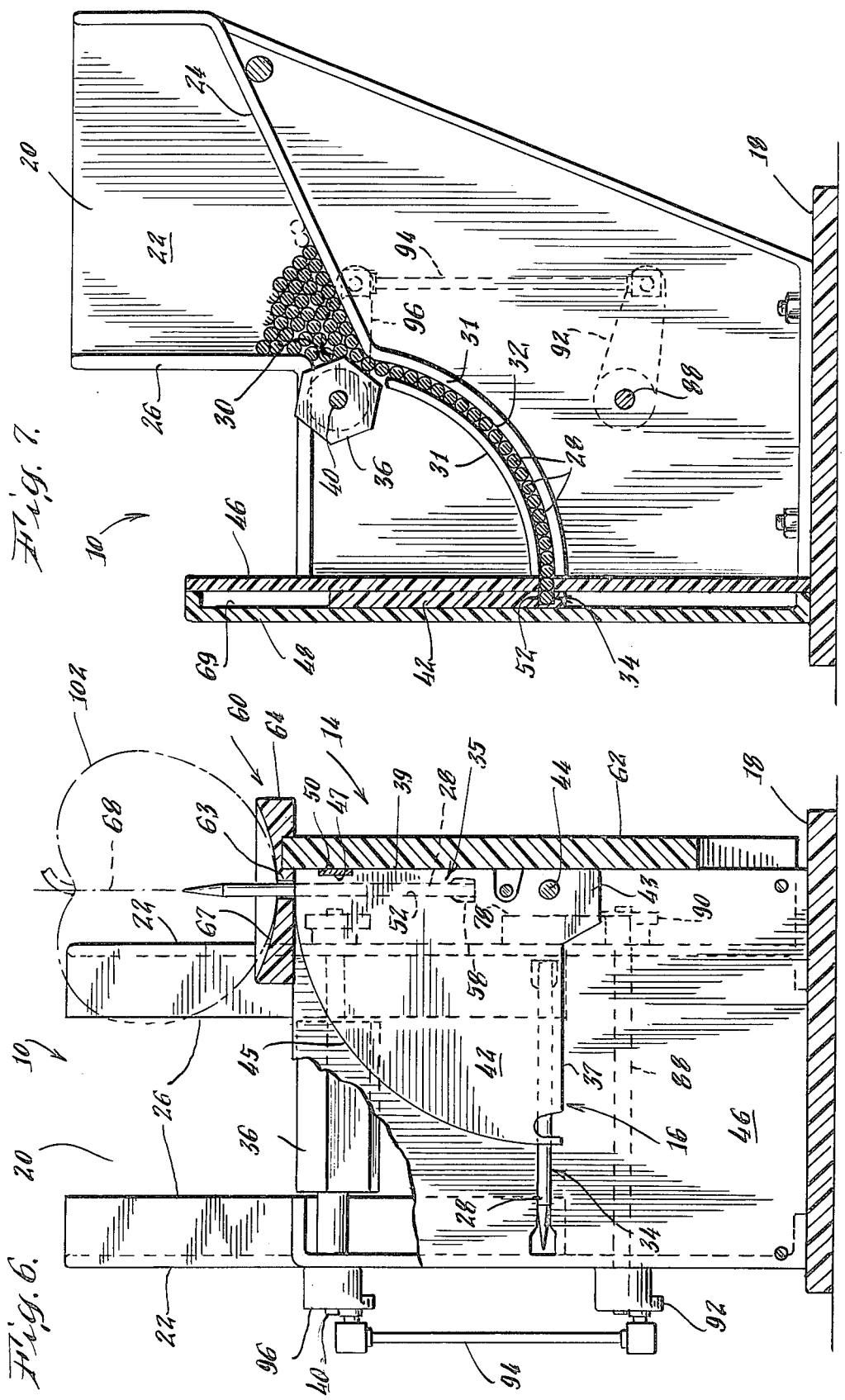

APPARATUS FOR DISPENSING AND INSERTING STICKS

TECHNICAL FIELD

This invention generally relates to apparatus for mounting food products or the like on sticks and deals more particularly with a device for automatically dispensing, shifting, rotating and inserting the sticks sequentially into the food product.

BACKGROUND OF THE INVENTION

Numerous food products such as hot dogs, apples and the like are mounted on elongate stick handles to facilitate handling and eating thereof by consumers. The sticks are made of paper and include a pointed end which may be inserted into the food product to mount the latter thereon. Various types of apparatus have been devised in the past to partially automate the process of inserting the sticks into the food products. For example, U.S. Pat. No. 4,062,108 discloses a stick insertion apparatus provided with a hopper for storing a plurality of sticks in a horizontal position and sequentially delivering the same through a supply duct to a feed station aligned with a horizontal insertion axis; the food product is held between a pair of reciprocable jaws while a reciprocating drive rod forces a stick at the feed station into the stationarily held food product. Although this apparatus is satisfactory in some applications, it requires that the product be held with some force imposed by the jaws which may in some cases damage the food product, and in any event requires considerable structure and mechanism. Furthermore, this apparatus requires that the food product be rotated ninety degrees to a horizontal position which is undesirable in the case of food products which must remain in an upright position prior to, and during comsumption thereof.

Another device for inserting sticks into food products is disclosed in U.S. Pat. No. 4,025,032. This latter mentioned device comprises a spring loaded, vertically reciprocable plunger provided with a cradle for holding the food product in an upright position and a bore extending longitudinally through the plunger aligned with an insertion axis. Sticks are manually placed into the bore after which the food product is placed on the cradle and the plunger is shifted downwardly, thereby inserting the stick into the food product; while the insertion operation of this type of device is quite satisfactory, some inefficiency is associated with the need for manually feeding the individual sticks into the plunger bore.

SUMMARY OF THE INVENTION

The present invention provides a significant advancement in the art by providing a novel combination for automatically dispensing, shifting, rotating and inserting sticks sequentially into food products. A stick delivery means is provided which includes a hopper for storing a plurality of sticks therein, each suitable for mounting food products or the like thereon, and an arcuate passageway communicating with a dispensing opening in the hopper through which individual ones of the sticks are drawn under the influence of gravity to a feed station whereat the sticks are disposed in a horizontal position. Stick shifting means are provided which include a rotatable wheel segment mounted adjacent a guide wall and provided with a single stick receiving slot therein. The rotatable wheel segment is disposed adjacent the stick feed station and both sequentially shifts and rotates sticks from the feed station to a stick inserting means. The wheel segment is provided with a pedestal adjacent the slot therein for supporting one end of a stick in an upright position in alignment with an insertion axis when the slot is shifted to an inserting station.

The stick inserting means comprises vertically shiftable, product supporting structure vertically aligned with the inserting station for shifting a product placed thereon along the insertion axis toward a stick supported on the pedestal of the wheel segment thereby inserting the stick into the product. Structure coupling the stick inserting means with the rotatable wheel segment automatically rotates the latter as the product supporting structure is shifted, thereby successively shifting and rotating sticks from the feed station to the inserting station. Additional mechanism is provided coupling the stick inserting means with the stick delivery means for agitating sticks contained within the hopper in order to prevent jamming of the sticks at the dispensing opening in the hopper.

DESCRIPTION OF THE DRAWING

In the drawings, wherein like numerals are employed to represent like parts in the various views:

FIG. 1 is a front view of apparatus for dispensing and inserting sticks into food products in a non-use position, which forms the preferred embodiment of the present invention, parts being broken away in section to improve clarity, certain parts thereof hidden from view being indicated in the phantom;

FIG. 2 is a side elevational view of the apparatus shown in FIG. 1, certain parts thereof hidden from view being indicated in the phantom;

FIG. 3 is a top plan view of the apparatus in FIG. 1, certain parts thereof hidden from view being indicated in the phantom;

FIG. 4 is a sectional view taken along the line 4—4 in FIG. 3, but showing the product supporting means having been shifted partially downward and a stick being shifted to the inserting station;

FIG. 5 is a fragmentary view similar to FIG. 4 but showing the product supporting means shifted downwardly to a greater extent with a stick having been delivered to the inserting station by the wheel segment;

FIG. 6 is a view similar to FIG. 4 but depicting the product supporting means shifted to its lowest position and a stick having been inserted into an apple which is indicated in the phantom;

FIG. 7 is a sectional view taken along the line 7—7 in FIG. 3;

DETAILED DESCRIPTION OF THE INVENTION

Figure 8:
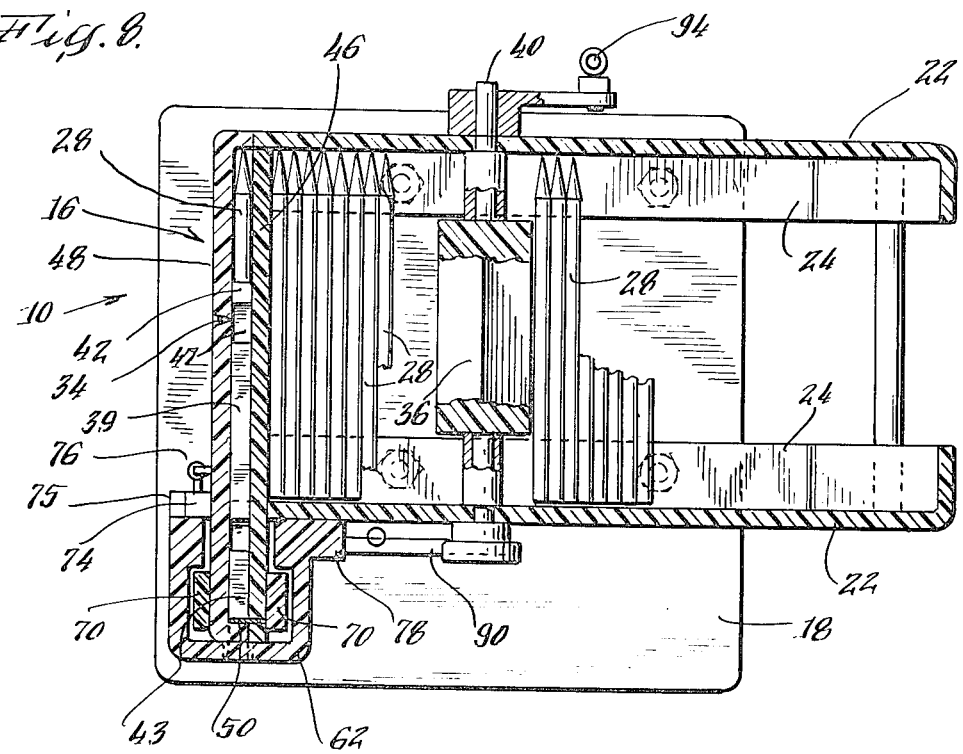
FIG. 8 is a sectional view taken along the line 8—8 in FIG. 2.

Referring now to the drawings, apparatus for dispensing and inserting sticks generally indicated by the numeral 10 comprises stick delivery means 12, means 14 for inserting sticks into a product, and means generally indicated at 16 for shifting such sticks from the delivery means 12 to the inserting means 14. Delivery means 12, inserting means 14 and shifting means 16 are suitably mounted on the generally rectangular, planar base 18.

Delivery means 12 includes a hopper 20 comprising a pair of upright, spaced apart parallel side walls 22 respectively joined to a pair of spaced apart support tracks 24 which slope downwardly toward the front of the apparatus 10. A pair of vertical spaced apart retaining walls 26 are formed integral with the forward vertical edges of the side walls 22, and extend inwardly toward each other. Retaining walls 26 are suitably spaced apart to engage the opposite ends of the sticks 28 and thereby prevent the escape thereof from the front of the hooper 20. A space is provided between the lower, forward edges of the support tracks 24 and the lower extremities of the retaining walls 26 to form a dispensing opening or throat 30 through which individual ones of the sticks 28 may pass. Delivery means 12 also includes structure in the nature of a pair of curved, spaced guide tracks 31 defining an arcuate supply duct or passageway 32 which comprises a cross section corresponding to the longitudinal sections of each of the sticks 28 for allowing individual ones of the sticks 28 to pass therethrough. Passageway 32 communicates with the throat 30 at one end thereof, and extends downwardly and toward the front of the apparatus 10. The other end of the passageway 32 terminates in a rectangularly shaped opening having the longitudinal side thereof extending essentially horizontally and defining a feed station 34 adjacent the stick shifting means 16.

Delivery means 12 further includes agitator means comprising a horizontally extending, elongate agitator member 36 having the opposite ends thereof rotatably journaled in the corresponding ones of the side walls 22. Agitator member 36 is provided with beveled exterior surface areas forming a polygonally shaped cross-section. The lower, rearward surfaces of the agitator member 36 extend into the throat 30 and are selectively engagable with the sticks 28 entering the passageway 32. Agitator member 36 includes a shaft portion 40 extending through one of the side walls 22 and is operably coupled with a later discussed drive mechanism for causing the member 36 to rotate.

Stick shifting means 16 includes a rotatable planar member 42 formed in the shape of a quarter section of a circle rotatably mounted on a forwardly extending, horizontal shaft 44, which is secured in an upright guide wall 46. Guide wall 46 is secured to the base 18 adjacent to, and parallel with, planar member 42, on the rear side of the latter. A cover plate 48 spaced forwardly from the guide wall 46 is secured to the latter by screws 49 and defines a spacing through which the planar member 42 may shift. The shaft 44 extends through the planar member 42 adjacent one corner thereof defined by the intersection of the two essentially straight edges 37 and 39 respectively. The planar member 42 includes an extension 43 forming a lever arm on one side of the shaft 44, spaced from the latter in a direction away from the curved peripheral edge 45. Edge 39 is further provided with a notch 47 therein adapted to receive and engage a stop element 50 which is secured to the guide wall 46 and functions to limit the swinging movement of the planar member 42 in a clockwise direction, as viewed in FIGS. 1, 4, 5, and 6.

Planar member 42 is provided with a stick receiving slot 52 defined by notched sections in the rear face thereof. Slot 52 extends along edge 37, parallel to the latter, from central sections of the member 42 to the curved outer edge thereof. As shown in FIGS. 4 and 5, the length of slot 52 is less than the length of each of the sticks 28, whereby the extremity of one of the sticks 28 disposed in the slot 52 extends outwardly beyond the curved edge 45. One end of the slot 52 adjacent shaft 44 includes a surface forming a pedestal 58 for engaging one end of a stick 28 in the slot 52 and supporting such stick 28 when the latter has been shifted to a vertical position, as shown in FIG. 5. The slot 52 is disposed in registration with a stick feed station 28 defined by the rectangularly shaped opening presented by the passageway 32 when edge 39 is disposed horizontally, and is disposed in registration with a stick inserting station 35 when the edge 39 is in a vertical position.

Inserting means 14 includes a vertically reciprocable plunger-like product supporting means 60 comprising an elongate, essentially hollow upright casing 62 having side walls forming a U-shaped cross section and provided with a circular disc 64 mounted on the upper end thereof by any suitable means. Circular disc 64 includes a dish shaped depression 67 in the upper surface thereof and is provided with a hole 63 through the longitudinal axis thereof of sufficient diameter to allow one of the sticks 28 to pass therethrough. The longitudinal axis of the casing 62 and hole 63 is aligned with a vertically extending insertion axis 68 which also passes through the inserting station 35. Casing 62 is provided with a vertically extending, longitudinal opening 69 therein adjacent the planar member 42 within which one vertical edge of the guide wall 46 and cover plate 48 is disposed, as best seen in FIG. 3. Casing 62 includes a pair of opposed, longitudinally extending notches in the interior side walls thereof within which there is slidably received guide rails 70. Guide rails 70 are suitably mounted on opposite exterior sides of the guide wall 46 and cover plate 48, thereby mounting the product supporting means 60 for reciprocable vertical movement in alignment with the insertion axis 68. An outwardly extending stem 72 secured to the lower end of the casing 62 has one end of a helical spring 76 secured thereto, the opposite end of the spring 76 being secured to upper areas of the cover plate 48. Spring 76 bias the supporting means 60 upwardly. A stop block 74 is secured to the upper section of the cover plate 48, adjacent the casing 62 and is operative to engage an extension 75 of one wall of the housing, thereby limiting the upward travel of the casing 62.

Structure for producing automatic rotation of the planar member 42 upon vertical shifting of the product supporting means 60 includes a cutout section 80 in one wall of the casing 62 which defines a surface that impinges upon that portion of the edge 39 defining extension 43.

Drive mechanism for actuating the earlier discussed agitating means includes a horizontally extending drive shaft 88 journaled in lower portions of the side walls 22 and having secured to one end thereof, one end of the drive lever 90. The opposite end of lever 90 is disposed in vertical registration with, and beneath, the lower edge of a cam block 78 made fast to upper areas of the casing 62 and is adapted to be engaged by the latter. A spring 77 is coupled between the free outer end of lever 90 and upper sections of the adjacent side wall 22 for normally biasing the lever arm 90 in a clockwise direction as viewed in FIG. 2. A lower crank arm 92 has one end thereof secured to the other end of the drive shaft 88 while the opposite end of arm 92 is pivotally coupled with the lower end of drive rod 94. An upper crank arm 96 is coupled between the upper end of rod 94 and the rotably mounted agitator member 36.

Figure 9:
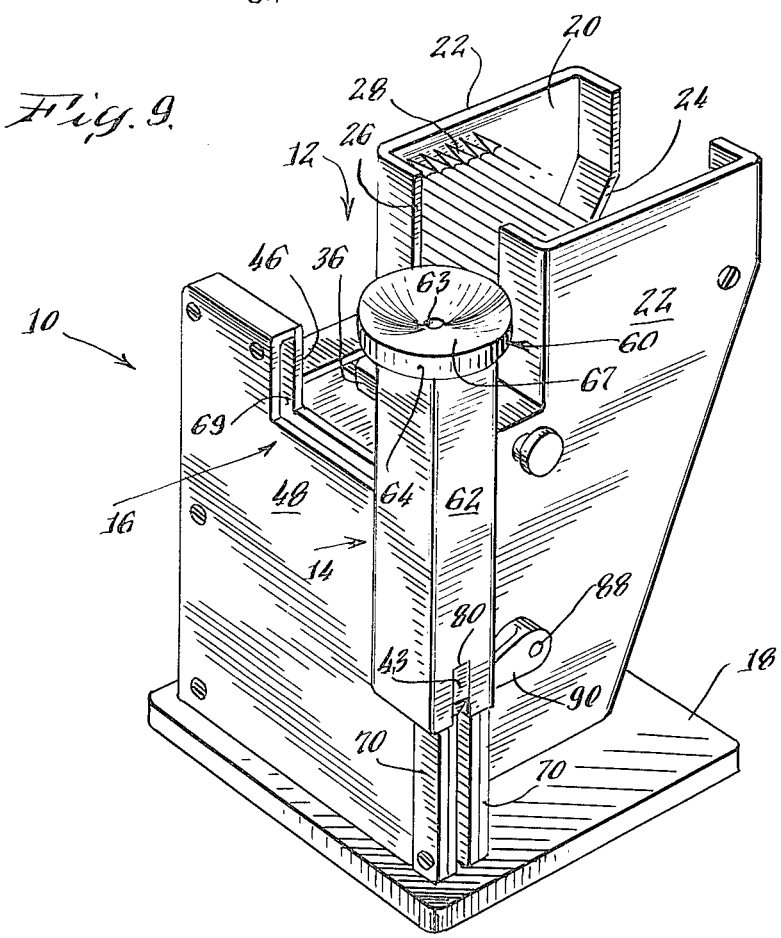
FIG. 9 is a perspective view of the apparatus shown in a non-use condition.

Turning now to the operation of the apparatus 10, let it first be assumed that the hopper 20 is loaded with a plurality of the sticks 28, and that the product supporting means is in its normal, raised position as shown in FIGS. 1, 2 and 9. At this point, the planar member 42 is in a lowered position with the slot 52 thereof disposed essentially horizontal in alignment with the feed station 34 and registering with the rectangular opening defined by the lower end of the passageway 32. The lower most stick 28 in the passageway 32 is then induced by gravity to roll into the slot 52, thereby loading the planar member 42. A product, such as an apple or the like indicated in the phantom by the numeral 102, is placed in the dish shaped depression 67 in readiness for inserting a stick therein. A user then applies a downwardly directed force upon the apple 102 in a direction indicated by the arrow 104 in FIGS. 4 and 5, against the biasing force imposed on the product supporting means 60 by the spring 76.

Force imposed on the product supporting means 60 is transferred to an edge defining the cutout section 80 in the casing 62, thereby delivering a downwardly directed force on the extension 43 of the planar member 42. The force imposed on extension 43 results in a torque being delivered to the planar member 42 resulting in rotational movement of the latter about the shaft 44, in a clockwise direction, as viewed in FIGS. 4, 5 and 6. As the product supporting means 60 shifts downwardly, slidably guided by the guide rails 70, planar member 42 is made to rotate, thereby likewise shifting and rotating one of the sticks 28 captured within the slot 52. As the planar member 42 rotates, the stick 28 is retained within the slot by virtue of the guide wall 46 being closely spaced to the interior face of the planar member 42. During the rotational process of planar member 42, the next to be inserted stick 28 disposed in the lower most position within the passageway 32 is prevented from entering the feed station 34 by virtue of the continuous smooth face of planar member 42 which slidably contacts and blocks further downward movement of the next to be inserted stick until the slot 52 returns to the feed station 34.

The opening between upper edges of the cover plate 48 and guide wall 46, as well as the vertical, longitudinally extending opening 69 in the casing 62 allow free, uninhibited rotation of the upper pointed end of the stick 28 within the slot 52. Further downward travel of the product supporting means 60 results in additional rotational movement of the planar member 42 until the stick 28 disposed within the slot 52 is delivered to the inserting station 35 whereat the stick 28 is aligned with the insertion axis 68, and the lower end of the stick 28 is firmly supported by the pedestal 58. At this point, the circular disc 64 is slightly spaced above the pointed tip of the stick 28 at the inserting station 35, as shown in FIG. 5, and the extension 43 of planar member 42 has shifted inwardly, away from the cutout section 80 and in vertically clearing relationship to the latter.

As product supporting means 60 continues to travel downwardly, the edge 39 defining the extension 43 slidably contacts the interior surface of one of the side walls defining casing 60, and blocks the return movement of planar member 42, thereby maintaining the stick 28 in an upright position. Additional downward travel of product supporting means 60 results in the passage of the upper end of the stick 28 through the hole 63 in disc 64, and into the apple 102. The dimensions of the various components will be selected such that the product supporting means 60 "bottoms out" when the stick 28 has been inserted a desired distance into the apple 102. For example, in the preferred embodiment illustrated herein, the lower side of the disc 64 contacts upper edges of the cover plate 48 in guide wall 46 when the product supporting means 60 reaches its lower most position; alternatively, a stop (not shown) might be secured to the base 18 beneath one of the side walls of the casing 62 which contacts a lower edge of the latter to limit the maximum downward travel of the product supporting means 60.

As the product supporting means 60 is shifted downwardly, a lower edge of the cam 78 contacts the free outer extremity of the drive lever 90, thereby rotating the latter which in turn rotates crank arm 92 via shaft 88. Rotation of crank arm 92 shifts drive rod 94 to produce incremental rotation of crank arm 96 as well as agitator member 36. This slight rotation of agitator member 36 results in shifting of the sticks 28 adjacent the throat 30, thereby tending to separate such sticks 28 slightly to prevent jamming thereof.

A stick 28 having been inserted into the apple 102, the user then withdraws downward directed force being imposed on the product supporting means 60, whereupon spring 76 urges product supporting means 60 to travel upwardly along the guide rails 70 to its starting position. As product supporting means 60 moves upwardly, the stick 28 remains inserted into the apple 102, while lower portions of the stick 28 slidably exit from the slot 52 in the planar member 42 and through the hole 63 of the disc 64. When product supporting means 60 has moved upwardly a sufficient distance to allow the lower end of the stick 28 in apple 102 to clear the curved outer edge 45 the planar member 42, gravity induces the planar member 42 to rotate in a counterclockwise direction, as viewed in FIGS. 4, 5 and 6, back to its starting position, with slot 52 in registration with the feed station 34, whereupon the next to be inserted stick 28 rolls into the slot 52. When the product supporting means 60 returns to its raised, starting position, the apple 102, along with the stick 28 inserted therein, may be vertically lifted to remove the lower extremities of the stick 28 from the product supporting means 60.

From the foregoing, it is apparent that after each successive downstroke of the product supporting means 60, a stick 28 enters the slot 52 from the passageway 32 and the apparatus 10 is readied for its next insertion cycle. The dimensions and location of the various component parts of the apparatus 10 will be selected in a manner to produce relatively rapid rotational movement of the planar member 42 in relation to the downward displacement of the product supporting means 60 in order to quickly transfer the sticks 28 from a horizontal position to a vertical insertion position, thereby eliminating the necessity of successively cycling the apparatus 10 in order to first shift the sticks from a horizontal to vertical position, and then insert such sticks into the product in separate stroking operations.

Thus, it is apparent that the invention provides apparatus for sequentially shifting and rotating each of a plurality of sticks from a horizontal position at a feed station to a vertical position aligned with an insertion axis in a single stroke to allow semi-automatic insertion of the sticks into a food product. It can be appreciated that the present invention provides a highly effective, but relatively simple mechanism for sequentially delivering each of the plurality of sticks to a manually operated inserting means in synchronization with the latter's operation in order to automate the step of positioning the sticks along an insertion axis. It is recognized, of course, that those skilled in the art may make various modifications or additions to the preferred embodiment chosen to illustrate the invention without departing from the gist and essence of the present contribution to the art. Accordingly, it is to be understood that the protection sought and afforded hereby should be deemed to extend to the subject matter claimed in all equivalents thereof fairly within the scope of the invention.

What is claimed is:

1. Apparatus for mounting a product on a stick, including:
   reciprocating means for inserting said stick into said product along an axis of insertion;
   means for delivering said stick to a feed position wherein the longitudinal axis of a stick thereat forms an angle with respect to said insertion axis; and
   rotatable means operatively coupled to said reciprocating inserting means for rotatably shifting said stick from said feed position to said inserting means and into longitudinal alignment with said insertion axis in response to downward movement of said inserting means.

2. The apparatus of claim 1, wherein said stick delivery means includes a feed station for supporting said stick in said feed position thereof, and said inserting means includes an inserting station for supporting said sticks in longitudinal alignment with said axis of insertion.

3. The apparatus of claim 2 wherein said stick shifting means includes rotatable structure provided with a slotted portion for receiving one of said sticks therein, said rotatable structure being rotatable between first and second positions in communication with said feed station and said inserting station respectively, and said inserting means includes structure shiftable into engagement with said rotatable structure for causing the latter to rotate whereby to shift said stick from said feed station to said inserting station.

4. The apparatus of claim 3, wherein said inserting means includes:
   means for supporting said product thereon and provided with an opening therethrough generally aligned with said inserting axis for allowing passage of one end of said stick therethrough and into said product,
   means operably coupled to said product supporting means for mounting the latter for vertical reciprocable movement toward and away from said inserting station, and
   means operably coupled to said product supporting means for normally biasing the latter for movement away from said inserting station.

5. The apparatus of claim 4, wherein:
   said product supporting means comprises a support member having said opening passing axially therethrough and adapted to support said product thereon,
   said mounting means comprises an elongate casing having the longitudinal axis thereof essentially vertically aligned and having said support member mounted on the upper end thereof, said casing including longitudinally extending channel areas in the interior thereof,
   said inserting station being disposed within said casing and said mounting means further comprising vertically extending stationarily mounted guide members matingly received within said channel areas of said casing for maintaining said longitudinal axis of the latter in said vertical alignment, and
   said biasing means comprises a spring member connected to said casing.

6. The apparatus of claim 5, wherein:
   said rotatable member comprises a planar member having said slotted portion in one side thereof,
   said stick shifting means further includes an upright guide wall opposite said one side of said planar member and extending parallel to the latter, and
   said casing includes a longitudinal slot therein aligned with the plane of movement of said planar member.

7. The apparatus of claim 3, further including:
   a base for mounting said inserting means, said stick delivery means and said stick shifting means thereon,
   said stick delivery means including hopper means for storing a plurality of said sticks therein, said hopper means being provided with an opening in a lower portion thereof, and a passageway having an essentially rectangularly shaped cross section through which individual ones of said sticks may pass, said passageway being generally disposed beneath said hopper means and communicating with said hopper means opening and said feed station whereby to provide gravity induced delivery of sticks from the hopper means to the feed station.

8. The apparatus of claim 7, wherein said stick delivery means further comprises agitator means including a shiftable portion extending into said hopper means adjacent said opening in the latter for contacting said sticks therein to minimize jamming of said sticks passing through said opening into said passageway.

9. The apparatus of claim 8, wherein said shiftable portion includes a rotatable element and said agitator means further includes a drive mechanism operably coupled to said shiftable portion and said stick inserting means for selectively causing said rotatable element to rotate upon operation of said inserting means.

10. The apparatus of claim 9, wherein said drive mechanism comprises:
    a drive shaft having a lever mounted on one end thereof selectively engageable by said inserting means,
    a pair of crank arms respectively mounted on one end of said rotatable element and the other end of said drive shaft, and
    a connecting rod operably coupled between said crank arms for transferring rotational motion of said drive shaft to said rotatable element upon engagement of said lever by said inserting means.

11. Apparatus for mounting a product on a stick, including:
    means for inserting said stick into said product along an axis of insertion;
    means for delivering said stick to a feed position wherein the longitudinal axis of a stick thereat forms an angle with respect to said insertion axis; and
    means operably coupling said inserting means to said delivering means for shifting said stick from said feed position thereof to said inserting means and into longitudinal alignment with said insertion axis;

said stick delivery means includes a feed station for supporting said stick in said feed position thereof, and said inserting means includes an inserting station for supporting said sticks in longitudinal alignment with said axis of insertion;

said stick shifting means includes a rotatable structure provided with a slotted portion for receiving one of said sticks therein, said rotatable structure being rotatable between first and second positions in communication with said feed station and said inserting station respectively, and said inserting means includes structure shiftable into engagement with said rotatable structure for causing the latter to rotate whereby to shift said stick from said feed station to said insertion station;

said rotatable structure comprising an essentially planar member mounted adjacent said inserting station for pivotable motion about a reference axis extending essentially perpendicular to said insertion axis, said slotted portions comprising notched areas in at least one side wall of said planar member along one edge of the latter, and said planar member includes an engagable lever arm spaced from said reference axis in a direction away from said notched areas and in registration with said shiftable structure of said inserting means whereby to be engaged by the latter upon operation of said inserting means.

12. The apparatus of claim 11, wherein:

said insertion axis extends in an essentially vertical direction and said longitudinal axis of said stick at said feed position thereof extends in an essentially horizontal direction, said stick delivery means includes a passageway presenting a horizontally extending opening defining said feed station and communicating with said notched areas in said planar member when said slotted portion is disposed in said first position thereof, and said planar member includes a pedestal communicating with said notched areas therein and disposed at one end of the latter adjacent said reference axis, said pedestal being operative to support one end of said stick when the latter is inserted into said product along said insertion axis.

13. The apparatus of claim 12, wherein:

said planar member is essentially in the shape of a quarter section of a circle and said reference axis extends through said planar member at a point opposite the arcuate periphery of said planar member, and the length of said slotted portion is less than the length of one of said sticks, there being further provided a stop member stationarily mounted adjacent said inserting station and in alignment with the plane of motion of said planar member whereby to engage the latter when said slotted portion is shifted to said second position thereof.

14. Apparatus for shifting and rotating an elongate stick or the like from a first position wherein the longitudinal axis of said stick is aligned in a first direction, to a second position wherein said latter mentioned axis is aligned in a second direction angularly displaced from said first direction, comprising:

a swingable member having a slotted section for receiving at least portions of said stick therein;

means for mounting said swingable member for swinging movement about a reference axis extending essentially perpendicular to said first and second directions;

means communicating with said swingable member for sequentially delivering each of a plurality of sticks to said slotted section in said swingable member;

a wall disposed adjacent said swingable member and facing said slotted section, said wall extending parallel to said first direction and operative for guiding said stick during shifting and rotation of the latter, whereby to maintain said stick axis in essentially a single plane, said swingable member including a pedestal for engaging one end of said stick when the latter reaches said second position thereof whereby to support said stick in said second position thereof.

* * * * *